United States Patent [19]
> Hoffmann

[11] 3,920,104
[45] Nov. 18, 1975

[54] PARTIAL LINING DISC BRAKE
[75] Inventor: Friedrich Hoffmann, Stuttgart, Germany
[73] Assignee: Daimler-Benz Aktiengesellschaft, Stuttgart, Germany
[22] Filed: Nov. 14, 1973
[21] Appl. No.: 415,528

[30] Foreign Application Priority Data
Nov. 14, 1972 Germany............................ 2255678

[52] U.S. Cl. ............. 188/73.3; 188/73.1; 188/73.5; 188/250 B
[51] Int. Cl.²......................................... F16D 65/02
[58] Field of Search ....... 188/72.5, 72.4, 73.3, 73.1, 188/73.5, 250 B, 73.4

[56] References Cited
UNITED STATES PATENTS
3,261,429  7/1966  Burnett et al...................... 188/72.5
3,368,647  2/1968  Laverdant........................ 188/73.3
3,613,836  10/1971  Dowell............................ 188/71.1
3,768,605  10/1973  Carre............................. 188/73.5

FOREIGN PATENTS OR APPLICATIONS
828,961  2/1960  United Kingdom................ 188/73.6

Primary Examiner—George E. A. Halvosa
Attorney, Agent, or Firm—Craig & Antonelli

[57]                  ABSTRACT
A partial lining disc brake, preferably with a floating saddle, whose brake pads are supported at the inlet side and/or at the outlet side by projections which are axially displaceably guided with respect to the brake body in apertures matched to the projection as well as at a rail; at least one projection provided with a support surface is thereby arranged between the supports provided at the inlet side and/or the outlet side; the projection thereby engages with a countersupport surface in a recess or cut-in matched thereto.

20 Claims, 5 Drawing Figures

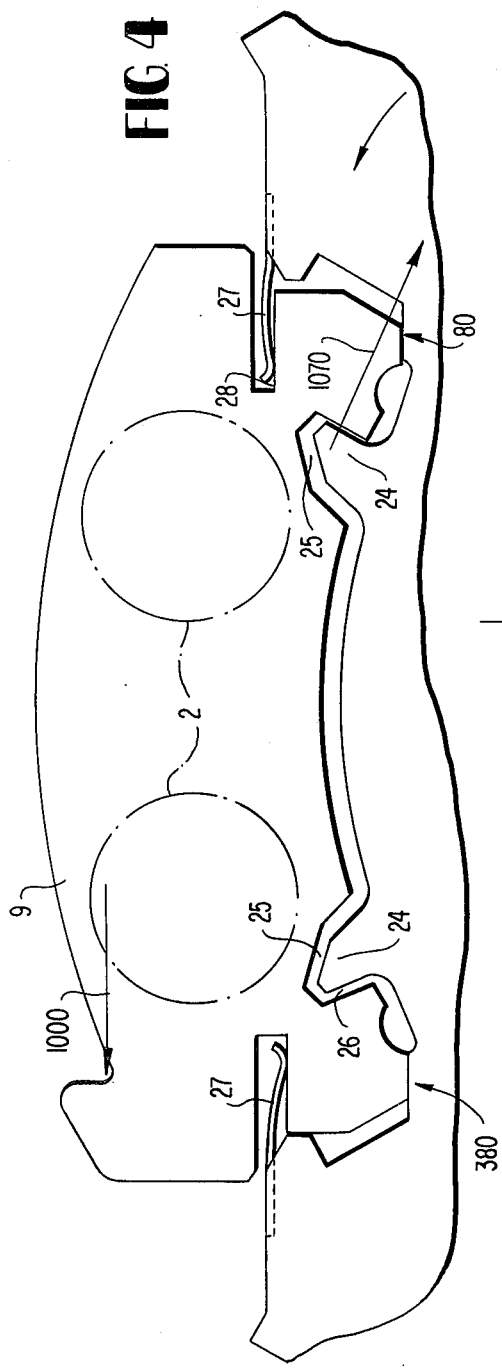
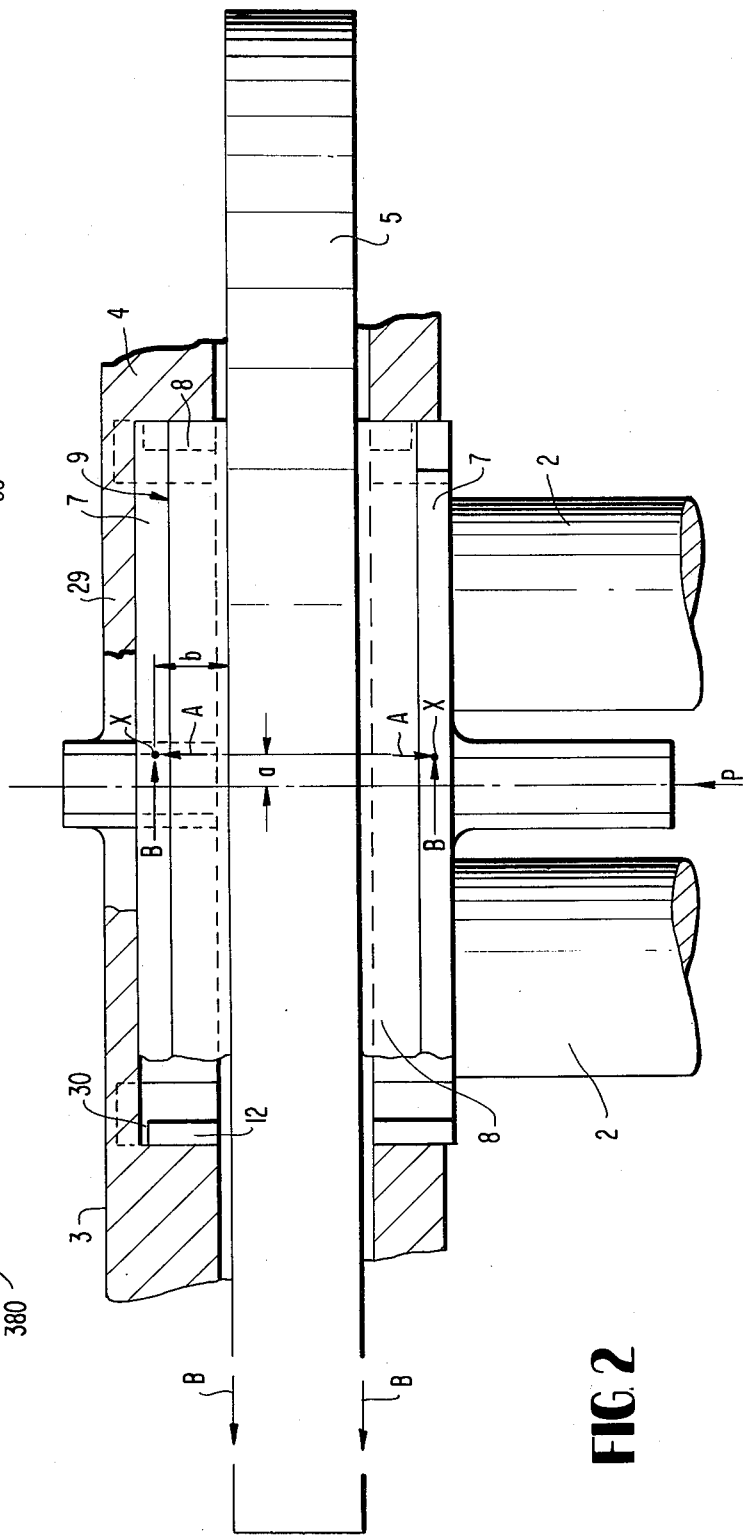
FIG. 4
FIG. 2

PARTIAL LINING DISC BRAKE

The present invention relates to a caliper type partial-lining disc brake, preferably of the type with a floating saddle (with brake pads engageable against respective opposite sides of a rotating brake disc) whose brake pads are supported at the entry side and/or outlet side (entry and outlet side with respect to relative movement of the rotating brake disc between the brake pads) by projections, in particular by mutually symmetrically oppositely disposed projections which are axially (direction parallel to axis of rotation of brake disc) displaceably guided with respect to the brake body in clearances or recesses matched thereto as at a rail.

Floating saddle brakes of customary construction tend to a high inclined wear of the brake linings. Owing to the friction losses occurring during the transmission of the reaction forces from the piston side to the non-piston side of the floating saddle brake and as a result of twisting of the floating saddle or of the brake housing frame, smaller forces are applied on the side of the floating saddle brake opposite the piston than on the piston side. This has a consequence that the lining disposed on the piston side, i.e., toward the vehicle center is worn off more strongly than the oppositely disposed outer lining.

Additionally, an uneven lining wear occurs. This can be explained predominantly by the fact that as a result of the canting of the frame, also the lining is positioned at an inclination and as a result thereof, more wear occurs at one side than at the other.

Brakes of known construction seek to counteract the inclined or oblique wear by a milling out at the annular surface of the piston pressure side. However, wedging and jamming forces occur as a result of these measures between the piston and the cylinder wall, and more particularly these forces are the higher the greater the eccentric offset of the annular surface to the center of the piston axis. Furthermore, one has to differentiate between the brake on the left side and the brake on the right side due to the asymmetrical milling out of the piston ring surface. A further disadvantage is the fact that the milling out is located on the wrong side during braking while backing up and therefore enhances to an increased extent the oblique wear as well as favors the brake squeaking.

The present invention is therefore concerned with the task to avoid completely a lining-oblique wear without having to accept thereby wedging forces between piston and cylinder wall. Additionally, the same brake should be utilized for the right as well as the left side of the vehicle.

Consequently, consideration had to be given as to how it could be avoided that the forces act differently strongly on the brake lining at different places. Consequently, a way had to be found which prevents the one-sided surface or contact pressure on the brake lining. Consequently, it is the aim of the present invention to keep the contact pressure between brake disc and brake lining constant over the entire lining surface. Only in this case both the oblique wear as also the non-uniform lining wear inwardly and outwardly disappeared. Furthermore, it is the aim of the present invention to realize a disc brake of a construction which is as simple as possible, and in which the uniformly worn brake lining can be readily interchanged without having to remove beforehand parts of the brake.

The underlying problems are solved according to the present invention in that between the supports provided at the entry side and/or the outlet side at least one support surface having a nose or projection provided with a support surface is used which engages with a counter-support surface in a recess or notch matched thereto. The support surfaces are thereby advantageously arranged at a distance from the center of the brake lining. However, the present invention is not limited thereto but is also directed to such brakes whose support surfaces are disposed in the center or nearly in the center. With such a construction, however, a residual moment will still occur which one might accept under certain special circumstances but otherwise should attempt to avoid.

The brake according to the present invention may now be so constructed that the projections are arranged at the brake pad and the associated recesses at the brake body. These projections and recesses or apertures, which may form together the rail guidance, may also be arranged, however, reversely so that the projections are arranged in the brake body and the recesses or apertures in the brake pads. Furthermore, the projection may be arranged at the bridge of the brake body which connects with each other the two saddle legs and the associated recess or cut-in may be arranged in the brake pad. However, the brake may also be constructed reversely so that the projection is arranged at the brake pad and the associated cut-in or recess at the bridge of the brake body.

With partial lining disc brakes, in which support surfaces disposed at the projections of the brake pads extend perpendicularly to the axial center plane of the brake, according to a further feature of the present invention, the support surface formed by the projection which extends parallel to the axial center plane, may have a spacing from the same which represents a function of the thickness of the brake lining and of the friction coefficient. The forces which otherwise seek to position the brake pad obliquely, are thereby mutually cancelled if the distance of the axial center plane from the support surface is equal to the quotient formed by the mean distance of the brake lining carrier to the associated surface of the brake disc and the friction coefficient.

In another partial-lining disc brake according to the present invention, in which support surfaces disposed at the projections extend perpendicularly or at an inclination to the axial center plane, at least one projection may be arranged advantageously at the brake housing which engages into a recess or cut-in matched thereto, and the support surfaces of the projection as well as of the associated cut-in or recess may be arranged obliquely to one another with an angle apex pointing toward the brake disc periphery, which presses the brake pad during actuation of the brake in the direction toward the periphery of the brake disc. On the other hand, with a partial-lining disc brake whose support surfaces disposed at the projections extend perpendicularly or obliquely to the axial center plane, at least one projection may be advantageously arranged at the brake housing which engages into a cut-in or recess matched thereto, and the support surfaces of the projection as well as of the associated cut-in may be arranged obliquely to one another with an agle apex pointing toward the brake disc center, which presses the brake pad during actuation of the brake in the direction toward the center of the brake disc. The arrangement and inclination of the support surfaces as regards the respectively occurring load conditions, may be determined according to the invention with the assistance of the Culmann straight line method. This Culmann straight line represents the connection between the points of intersection of the forces determined on both sides of the support of the brake pad. If a brake is so constructed according to the principles of the invention, the inclined wear can be avoided in that the moments resulting from the forces engaging at the lining become zero. The piston may then also act with its full ring-shaped pressure surface onto the opposite lining surface of flat construction.

In order that a rattling is avoided during the driving of the vehicle, a spring is provided at the brake housing which may be constructed preferably as leaf spring, which presses the brake pad from the beginning in the direction into which a pressure is exerted as a result of the inclination of the support surfaces during the actuation of the brake by the brake pad toward the periphery of the brake disc, and in the other case toward the brake disc center.

In order that the brake pads can be easily exchanged, they may be so constructed that they are guided axially displaceably exclusively with the brake lining carrier at the brake body rails formed by the projections and associated apertures which terminate at a distance in front of the bridge of the brake body corresponding to the thickness of the brake lining carrier which connects its saddle leg portions extending over the periphery of the brake disc. With such a construction of the brake, no part whatsoever has to be removed in order to exchange the brake pads after their wear. The brake pads then only need to be displaced up to the bridge of the brake body with corresponding displacement of the floating saddle away from the brake disc and may then be readily pulled out in the radial direction toward the brake disc. It even suffices if only one brake body rail terminates at the distance in front of the bridge of the brake body, and the brake pad after its wear is so taken out in the radial direction away from the disc up to the bridge of the brake body that it is taken out at first pivoted on the free side about the other side and then in the radial direction.

Accordingly, it is an object of the present invention to provide a partial-lining disc brake of the type described above which avoids by simple means the aforementioned shortcomings and drawbacks encountered in the prior art.

Another object of the present invention resides in a partial-lining disc brake which effectively avoids the inclined wear of the brake linings.

A further object of the present invention resides in a partial lining disc brake in which non-uniform wear of the linings is completely eliminated.

Still a further object of the present invention resides in a partial-lining disc brake of the type described above which achieves all of the aforementioned aims and objects without the occurrence of wedging forces between piston and cylinder wall.

Still another object of the present invention resides in a partial-lining disc brake which eliminates any squeaking and rattling while driving the vehicle.

A further object of the present invention resides in a partial-lining disc brake in which no difference exists between right and left brake.

Still a further object of the present invention resides in a partial-lining disc brake which is of extraordinarily simple construction, permitting a ready exchange of worn brake linings without the need to remove any parts of the brake assembly.

These and other objects, features, and advantages of the present invention will become more apparent from the following description when taken in connection with the accompanying drawing which shows, for purposes of illustration only, several embodiments in accordance with the present invention, and wherein:

FIG. 2 is a plan view of the brake of FIG. 1, also in schematic view and partly in cross section;

Figure 5:
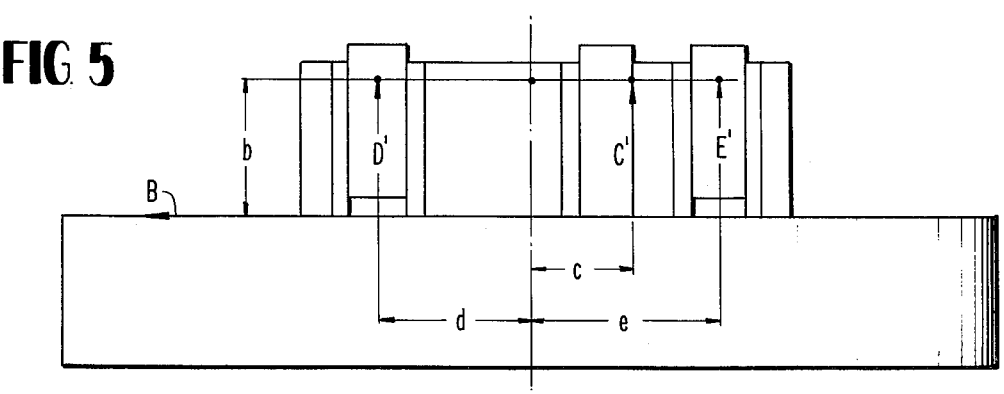

FIG. 4 is a schematic cross-sectional view through a still further modified embodiment of a floating saddle brake according to the present invention whose supports extend perpendicularly to the axial center plane of the brake and which is equipped with two projections whose support surfaces are so inclined that they press the brake lining during actuation of the brake in the direction toward the brake disc center; and FIG. 5 is a schematic view for explaining the forces and moments occurring in the brake illustrated in FIG. 4.

Figure 1:
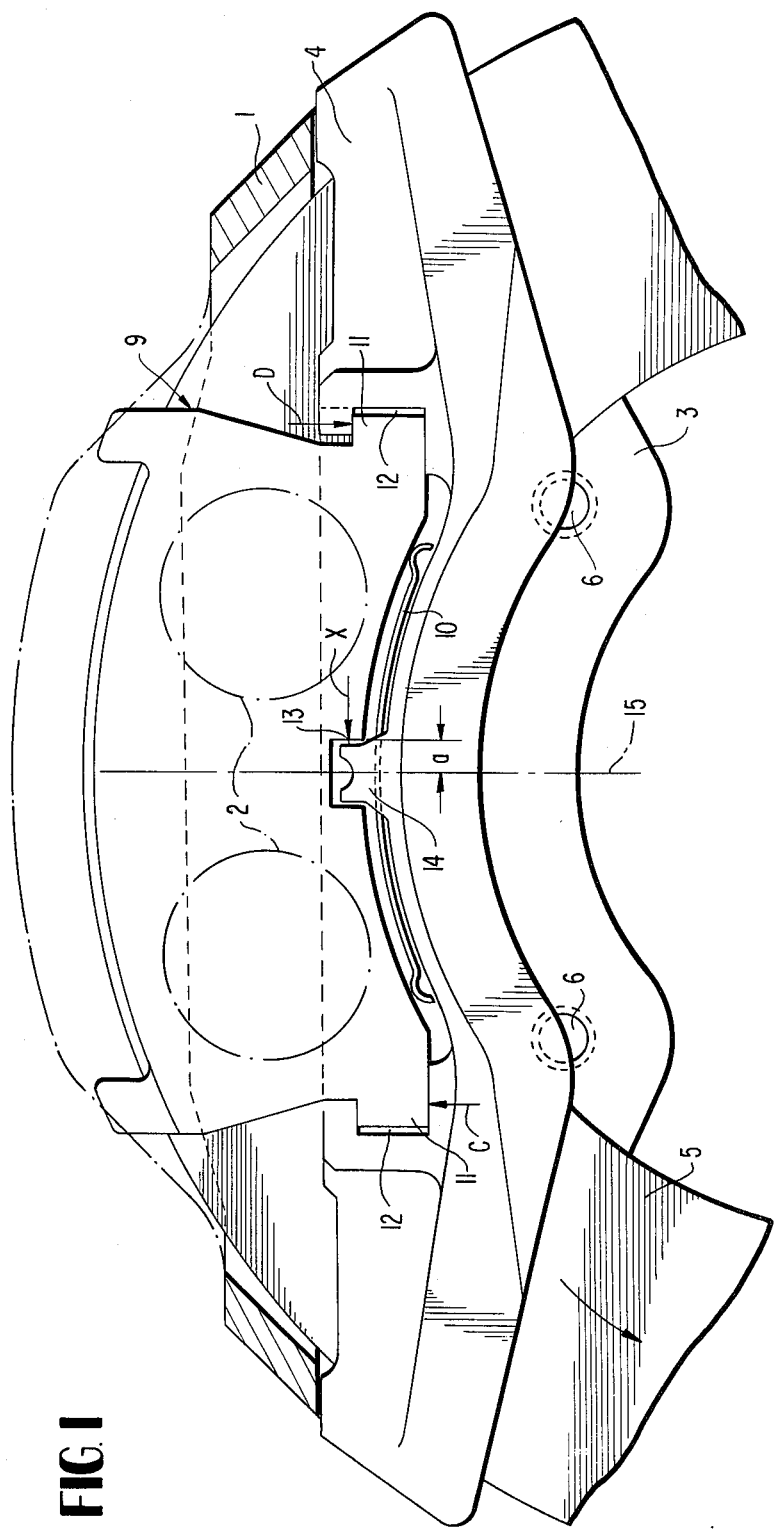
FIG. 1 is a schematic cross-sectional view through a partial-lining disc brake with floating saddle in accordance with the present invention.

Referring now to the drawing wherein like reference numerals are used throughout the various views to designate like parts, in the floating saddle brake illustrated in FIGS. 1 and 2, the floating saddle 1 which receives in a cylinder housing the two pistons 2, rests on the brake body 3, and it is thus carried by the brake body. The brake body 3 extends with its saddle leg portions 4 around the brake disc 5 and as to the rest is held fast at the vehicle with the aid of threaded holes 6 and screws. The brake pads generally designated by reference numeral 9 which consist of brake lining carrier 7 and brake lining 8 (FIG. 2) are provided at the entry side and outlet side (with respect to relative movement of disc 5) with projections 11 (FIG. 1) which engage into apertures or recesses 12 of the brake body 3 matched to these projections 11. The mutually fitting projections 11 and apertures 12 thus form rails in which the brake pads 9 are guided axially (direction parallel to axis of rotation of disc 5) displaceably with respect to the brake body 3.

During actuation of the brake, the force $B$ acts on the brake lining at the average distance $b$ due to the abutment force $P$ (FIG. 2) by way of the brake disc 5. A moment $A \cdot a$ has to counteract the moment $B \cdot b$. From the foregoing considerations, the following equations can be formulated:

$$B = (P - A) \cdot \mu_H$$
$$A = B \cdot \mu_T$$

$$A = \frac{P \cdot \mu_H \cdot \mu_T}{1 + \mu_H \cdot \mu_T}$$

$$A \cdot a - B \cdot b = 0$$

$$a = \frac{B \cdot b}{A}$$

-continued $$a = \frac{B \cdot b}{B \cdot \mu_T}$$

$$a = \frac{b}{\mu_T = \text{Carrier}}$$

It follows therefrom that the distance $a$ is equal to the quotient of the average distance $b$ of the brake lining carrier from the disc surface and the friction coefficient of the brake lining carrier at the brake carrier. Consequently, in this construction, the distance $a$ can be determined from the average or mean distance $b$ of the brake lining carrier from the brake disc surface, and the friction coefficient $\mu_T$, which distance $a$ the support surface 13 (FIG. 1) of the projection 14 must have from the axial center plane 15 of the brake pad. If this distance is maintained, then equilibrium exists between the occurring forces and the lining does not wear obliquely. The brake pad 9 then supports itself at the support points C, D, and X (FIG. 1). The rattling of the brake lining is prevented by the spring 10, also when the brake is not actuated during the drive.

Figure 3:
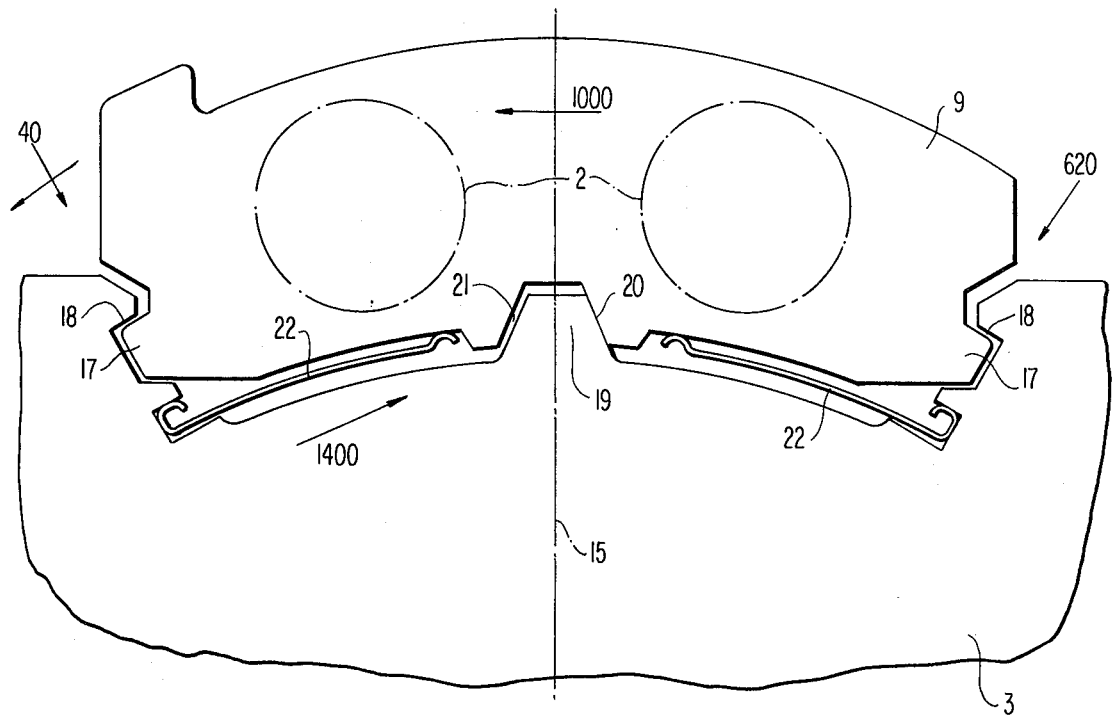
FIG. 3 is a partial schematic cross-sectional view through a floating saddle brake according to the present invention in which the supports at the brake pads and at the brake body are inclined to the axial center plane of the brake and the support surface of a projection has an inclination which presses the brake lining during actuation of the brake toward the periphery of the brake disc.

In the partial-lining disc brake illustrated in FIG. 3, the support surfaces 18 disposed at the projection 17 extend obliquely to the center plane 15 of the brake. A projection 19 is arranged at the brake body 3 which engages into a cut-in or aperture 21 matched thereto. The support surfaces of the projection 19 and of the associated cut-in 21 extend mutually obliquely with an angle apex pointing toward the periphery of the brake disc. As a result of the inclined arrangement of the support surfaces of the projection 19, the brake pad 9 is forced in the direction toward the periphery of the brake disc 5 during the actuation of the brake.

As has been resulted from a force determination with the aid of the Culmann straight line according to the arrangement in FIG. 3, the following forces occur in this construction: 40, 620, 1,000 and 1,400 kp. With such an arrangement of the projection 19 and of the selected inclination of the support surfaces 18 and 20, the illustrated forces acting on the brake lining and its surroundings are in equilibrium. A tilting of the brake lining as well as an oblique wear can no longer occur.

Since the brake lining during the actuation of the brake is forced in the direction toward the periphery of the brake disc 3 due to the inclination of the support surfaces 18 at the projection 19, this inclination is assisted in the rest condition by the springs 22. These springs 22 bring about that the brake linings do not rattle also during non-actuation of the brake.

In the embodiment of the brake illustrated in FIG. 4, two projections 24 are provided which engage each into a cut-in or recess 25 matched thereto. The support surfaces 26 of these projections 24 as well as the associated cut-ins or apertures are arranged obliquely to one another with an angle apex pointing toward the brake disc center. As a result of this inclined position of the support surfaces, the brake cushion 9 is forced during the actuation of the brake in the direction toward the center of the brake disc. Also in this case the occurring brake forces of a magnitude of 80, 380, 1,000 and 1,070 kp as well as their inclination were determined with the aid of the Culmann straight line. The following moment compensation results from the schematic view of FIG. 5:

$$B \cdot b + D' \cdot d - C' \cdot c - E' \cdot e = 0$$

In this equation
$$D' = D \cdot \mu_{Carrier\text{-}Lining}$$
$$C' = C \cdot \mu_{Carrier\text{-}Lining}$$
$$E' = E \cdot \mu_{Carrier\text{-}Lining}$$
and consequently,
$$B \cdot b + D \cdot d \cdot \mu_T - C \cdot c \cdot \mu_T - E \cdot e \cdot \mu_T = 0$$

With this arrangement, the inclined compensation is therefore completely established. Neither a tilting of the braking lining nor also an inclined wear of the lining can now take place any longer.

Since no tilting of the brake lining occurs any longer, also the brake saddle is no longer canted so that the abutment force on both sides is thereby approximately equalized and thus both brake linings are worn uniformly. The springs 27 which are also provided in this embodiment force during actuation of the brake, the brake lining toward the disc center, engaging at the projection 28, in the same manner as the inclination of the projections 24. Also in this case, the rattling of the brake lining during non-actuation of the brake is thereby avoided in the driving condition.

The brake pads of the described embodiments are guided exclusively with the brake lining carriers 7 axially displaceably at the rails formed by the projections 11 and the associated recesses or cut-outs 12 and are held by the same against a falling out. For interchanging the brake pads, one of the rails 11/12 terminates in front of the bridge 29 of the brake body at a distance 30 corresponding to the thickness of the brake lining, which connects its saddle legs 4 extending over the periphery of the brake disc 5.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:
1. A partial lining disc brake comprising:
a brake disc means,
brake carrier means including a first pair of spaced leg portions extending transversely of the axis of rotation of said brake disc means on respective sides thereof and a second pair of leg portions extending substantially parallel to the axis of rotation of said brake disc means and connecting the respective ends of said first pair of leg portions,
substantially C-shaped side guide rails provided on said brake carrier means on each side of said brake disc means at the inlet and outlet sides of said brake carrier means with respect to the direction of rotation of said brake disc means, said guide rails opening toward each other and extending in the direction of the axis of rotation of the brake disc means,
brake pad means disposed on each side of said brake disc means, each of said brake pad means including brake lining means and backing plate means for supporting said brake lining means, said backing plate means including an upper edge portion disposed at the periphery of the brake disc means, a lower edge portion disposed radially inwardly of said upper edge portion in the direction of the axis of rotation of said brake disc means, and lateral edge portions connecting the respective ends of said upper and lower edge portions, horizontally extending side projection means provided on each lateral edge portion of each of said backing plate means at the lower edge portion thereof, said side projection means forming a minor portion of said backing plate means, each of said horizontally extending side projection means being disposed in a respective side guide rail so as to be axially displaceably guided therein, intermediate projection means provided on said brake carrier means at the lower edge portion of said backing plate means, said intermediate projection means having intermediate guide support surface means disposed at an axial center plane of the brake which extends vertically through the axis of rotation of the brake disc means, said guide support surface means including first and second vertically extending support surfaces disposed on respective sides of the axial center plane of the brake and spaced therefrom by a predetermined distance, and intermediate guide aperture means provided on each of said backing plate means along the lower edge thereof between said horizontally extending side projection means, said intermediate guide aperture means including intermediate guide counter support surfaces which interengage said first and second vertically extending support surfaces of said intermediate guide support surface means.

2. A partial lining disc brake according to claim 1, characterized in that said horizontally extending side projection means are disposed symmetrically opposite one another with respect to the center plane of said brake pad means.

3. A partial lining disc brake according to claim 1, characterized in that said disc brake includes a floating saddle means.

4. A partial lining disc brake according to claim 1, characterized in that the predetermined distance from the axial center plane represents a predetermined function of the thickness of the brake lining means and of the friction coefficient of the relatively sliding surfaces at the brake pad means and brake disc means.

5. A partial lining disc brake according to claim 4, characterized in that the distance of the axial center plane from the intermediate guide support surface means is equal to the quotient of the mean distance of the brake lining carrier means from the associated brake surface of the brake disc means and the friction coefficient.

6. A partial lining disc brake according to claim 1, characterized in that said guide rail means terminates for the purposes of exchanging the brake lining means at a distance in front of one of said pair of spaced leg portions corresponding to the thickness of the brake lining carrier means.

7. A partial lining disc brake with a brake housing according to claim 1, characterized in that at least one spring means is provided intermediate the backing plate means and brake carrier means.

8. A partial lining disc brake according to claim 7, characterized in that said spring means is a leaf spring.

9. A partial lining disc brake according to claim 7, characterized in that the spring means forces the backing plate means in the direction toward the periphery of the brake disc means.

10. A partial lining disc brake according to claim 7, characterized in that the spring means forces the backing plate means in the direction toward the center of the brake disc means.

11. A partial lining disc brake comprising:
a brake disc means, brake carrier means including a first pair of spaced leg portions extending transversely of the axis of rotation of said brake disc means on respective side thereof and a second pair of leg portions extending substantially parallel to the axis of roation of the brake disc means and connecting the respective ends of said first pair of spaced leg portions, side guide rails provided on said brake carrier means on each side of said brake disc means at the inlet and outlet sides of said brake carrier means with respect to the direction of rotation of said brake disc means, said side guide rails extending in the direction of the axis of rotation of said brake disc means, brake pad means disposed on each side of said brake disc means including brake lining means and backing plate means for supporting said brake lining means, said backing plate means including an upper edge portion disposed at the periphery of the brake disc means, a lower edge portion disposed radially inwardly of said upper edge portion in the direction of the axis of rotation of said brake disc means, and lateral edge portions connecting the respective ends of said upper and lower edge portions, projection means provided along the lower edge portion of said backing plate means extending toward the axis of rotation of said brake disc means, each of said projection means being disposed in a respective side guide rail so as to be axially displaceably guided therein, said projection means and said side guide rails including engageable side guide support surface means arranged obliquely to one another with the angle apex pointing toward the center of the brake disc means, recess means provided on each lateral edge portion of said backing plate means at a position above said projection means, spring means mounted in said brake carrier means and disposed in said recess means on said backing plate means for urging said brake pad means toward the center of rotation of said brake disc means, whereby the orientation of said side guide support surface means forces the brake lining means during actuation of the brake in the direction toward the center of the brake disc means thereby resulting in uniform wear of the brake lining means.

12. A partial lining disc brake according to claim 11 characterized in that the arrangement and inclination of the support surface means are determined from the respectively prevailing load conditions with the aid of the Culmann straight line.

13. A partial lining disc brake according to claim 12, characterized in that a spring means is provided intermediate the brake carrier means and backing plate means.

14. A partial lining disc brake according to claim 13, characterized in that the spring means is a leaf spring.

15. A partial lining disc brake according to claim 13, characterized in that the spring means presses the backing plate means toward the center of the brake disc means.

16. A partial lining disc brake comprising:
a brake disc means, brake carrier means including a first pair of spaced leg portions extending transversely of the axis of rotation of said brake disc means on respective sides thereof and a second pair of leg portions extending substantially parallel to the axis of rotation of said brake disc means and connecting the respective ends of said first pair of spaced leg portions,
substantially C-shaped side guide rails provided on said brake carrier means on each side of said brake disc means at the inlet and outlet sides of said brake carrier means with respect to the direction of rotation of said brake disc means, said side guide rails opening toward each other and extending in the direction of the axis of rotation of the brake disc means,
brake pad means disposed in each side of said brake disc means, each of said brake pad means including brake lining means and backing plate means for supporting said brake lining means, said backing plate means including an upper edge portion disposed at the periphery of the brake disc means, a lower edge portion disposed radially inwardly of said upper edge portion in the direction of the axis of rotation of said brake disc means, and lateral edge portions connecting the respective ends of said upper and lower edge portions,
side projection means provided on each lateral edge portion of each of said backing plate means at the lower edge portion thereof, said side projection means forming a minor portion of said backing plate means, each of said side projection means being disposed in a respective side guide rail so as to be axially displaceably guided in said guide rail, each of said projection means and said guide rails including engageable side guide surface means which extend obliquely to an axial center plane of the brake which extends vertically through the axis of rotation of said brake disc means,
intermediate projection means provided on said brake carrier means at the lower edge portion of the backing plate means, said intermediate projection means having intermediate guide support surface means disposed at the axial center plane of the brake, said guide support surface means including first and second support surfaces which extend obliquely with an angle apex pointing toward the periphery of the brake disc means, said first and second support surfaces being disposed on respective sides of the axial center plane of the brake and spaced therefrom by a predetermined distance, and
intermediate guide aperture means provided on each of said backing plate means along the lower edge portion thereof between said side projection means, said intermediate guide aperture means including intermediate guide counter support surfaces which interengage said first and second mutually obliquely extending support surfaces of said intermediate guide support surface means.

17. A partial lining disc brake according to claim 16, characterized in that the arrangement and inclination of the support surface means are determined from the respectively prevailing load conditions with the aid of the Culmann straight line.

18. A partial lining disc brake according to claim 17, characterized in that at least one spring means is provided intermediate the brake carrier means and backing plate means.

19. A partial lining disc brake according to claim 18, characterized in that said spring means is a leaf spring.

20. A partial lining disc brake according to claim 18, characterized in that the spring means forces the backing plate means toward the periphery of the brake disc means.

* * * * *